United States Patent
Bartels

(10) Patent No.: US 12,208,841 B2
(45) Date of Patent: *Jan. 28, 2025

(54) MOTOR VEHICLE AND METHOD FOR CONTROLLING THE AERO BALANCE OF A MOTOR VEHICLE

(71) Applicant: Dr. Ing. h.c. F. Porsche Aktiengesellschaft, Stuttgart (DE)

(72) Inventor: Holger Bartels, Aspach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 295 days.

This patent is subject to a terminal disclaimer.

(21) Appl. No.: 17/872,218

(22) Filed: Jul. 25, 2022

(65) Prior Publication Data
US 2023/0039754 A1 Feb. 9, 2023

(30) Foreign Application Priority Data
Aug. 6, 2021 (DE) .......................... 102021120479.8

(51) Int. Cl.
*B62D 37/02* (2006.01)
*B62D 35/00* (2006.01)

(52) U.S. Cl.
CPC ........... *B62D 37/02* (2013.01); *B62D 35/005* (2013.01); *B62D 35/007* (2013.01)

(58) Field of Classification Search
CPC ..... B62D 37/02; B62D 35/005; B62D 35/007
See application file for complete search history.

(56) References Cited

U.S. PATENT DOCUMENTS

| | | | |
|---|---|---|---|
| 9,827,957 B2 | 11/2017 | Fahland et al. | |
| 10,336,317 B2 | 7/2019 | Fahland et al. | |
| 10,696,294 B2 | 6/2020 | Fahland et al. | |
| 2007/0257512 A1* | 11/2007 | Anderson | B62D 35/00 |
| | | | 296/180.1 |
| 2017/0088106 A1* | 3/2017 | Fahland | B60T 8/1766 |

(Continued)

FOREIGN PATENT DOCUMENTS

| | | |
|---|---|---|
| DE | 102011108706 A1 | 1/2013 |
| DE | 102016218181 A1 | 3/2017 |

(Continued)

*Primary Examiner* — Hunter B Lonsberry
*Assistant Examiner* — Harrison Heflin
(74) *Attorney, Agent, or Firm* — Buchanan Ingersoll & Rooney PC

(57) ABSTRACT

A motor vehicle with an automatically settable front wing and an automatically settable rear wing, each of which is settable under the control of an actuator. Owing to the incident flow of air at the front axle, a downforce at the front axle (FDF) can be set by positioning the front wing. Owing to the incident flow of air at the rear axle, a downforce at the rear axle (RDF) can be set by positioning the rear wing. A resultant downforce (DF) acting through a point (CoP) can be generated and an aero balance (AB) can be set. The rear wing and/or the front wing can be set automatically in dependence on an operating state of the motor vehicle such that a predetermined downforce (FDF) at the front axle, a predetermined downforce (RDF) at the rear axle, a predetermined resultant downforce (DF) and/or a predetermined aero balance (AB) is obtained.

14 Claims, 3 Drawing Sheets

(56) References Cited

U.S. PATENT DOCUMENTS

| | | | |
|---|---|---|---|
| 2018/0022343 A1* | 1/2018 | Fahland | B60W 10/30 |
| | | | 701/48 |
| 2019/0061843 A1* | 2/2019 | Fahland | G05D 3/125 |
| 2019/0263458 A1 | 8/2019 | Fahland et al. | |
| 2023/0038657 A1* | 2/2023 | Bartels | B62D 35/005 |

FOREIGN PATENT DOCUMENTS

| | | |
|---|---|---|
| DE | 102017116389 A1 | 1/2018 |
| DE | 102018123834 A1 | 4/2019 |
| DE | 102019104739 A1 | 8/2019 |

\* cited by examiner

MOTOR VEHICLE AND METHOD FOR CONTROLLING THE AERO BALANCE OF A MOTOR VEHICLE

CROSS-REFERENCE TO RELATED APPLICATION

This application claims priority to German Patent Application No. 102021120479.8, filed Aug. 6, 2021, the content of such application being incorporated by reference herein in its entirety.

FIELD OF THE INVENTION

The invention relates to a motor vehicle and to a method for controlling the aero balance of the motor vehicle.

BACKGROUND OF THE INVENTION

Motor vehicles with a front wing and with a rear wing are known in the prior art. Also known are motor vehicles with an adjustable front wing and with an adjustable rear wing. By means of the front wing and by means of the rear wing, owing to the incident flow of air at the front axle a downforce at the front axle FDF is created and owing to the incident flow of air at the rear axle a downforce at the rear axle RDF is created. A point CoP can thus be defined, through which a resultant downforce DF=(FDF+RDF) acts. The aero balance AB can be determined therefrom as FDF/DF*100%.

The aero balance is dependent on the setting of the front wing and on the setting of the rear wing. The driving characteristics of the motor vehicle are also dependent on the aero balance. For example, an understeer of the motor vehicle or an oversteer of the motor vehicle is also dependent on the aero balance. A conventional value of the aero balance in GT road vehicles is, for example, 35%.

In motor vehicles, it is known, for example, that the rear wing can be adjusted during driving operation of the motor vehicle in order to reduce the aerodynamic drag, in order to be able to achieve a higher final speed of the motor vehicle. A disadvantageous aero balance and thus critical vehicle handling can be present in various operating situations or driving states if the downforce and the aero balance are disregarded.

SUMMARY OF THE INVENTION

An exemplary embodiment of the invention relates to a motor vehicle with an automatically settable front wing and with an automatically settable rear wing, each of which is settable under the control of an actuator, wherein the motor vehicle has a front axle with front wheels and a rear axle with rear wheels, wherein, by means of the setting of the front wing and/or by means of the setting of the rear wing, owing to the incident flow of air at the front axle a downforce at the front axle (FDF) can be set and owing to the incident flow of air at the rear axle a downforce at the rear axle (RDF) can be set, wherein a resultant downforce DF=(FDF+RDF) acting through a point CoP can be generated and an aero balance (AB) as AB=FDF/DF*100% can be set, wherein the rear wing and/or the front wing can be set automatically in dependence on an operating state of the motor vehicle such that a predetermined downforce at the front axle (FDF), a predetermined downforce at the rear axle (RDF), a predetermined resultant downforce (DF) and/or a predetermined aero balance (AB) is obtained. It is thus achieved that the aero balance can be set automatically together with the downforce in order not to adversely affect the handling of the motor vehicle even in different operating states.

It is particularly advantageous if the operating state is determined by an operating mode that is present, in particular a so-called aero mode, and/or by actuation by the driver of an actuating means for setting the downforce and/or the aero balance. In this case, the operating state can be specified by a controller, for example, and/or can be specified by the driver of the motor vehicle. In particular a so-called aero mode can thus also be selectable by the driver and/or by the controller, in which mode different styles of the downforce and/or of the aero balance can be selected. For example, it is possible to choose between an operating mode with the lowest possible downforce and an operating mode with a higher downforce.

It is also advantageous if, when setting the front wing and/or the rear wing, the setting of the predetermined aero balance (AB) is prioritized before the setting of a predetermined downforce at the front axle (FDF), a predetermined downforce at the rear axle (RDF) and a predetermined resultant downforce (DF). It is thus achieved that the aero balance preferably lies within the preselected range, so that the handling of the motor vehicle is ensured and optionally the downforce does not achieve the required target values.

It is also advantageous if the setting of the front wing and/or of the rear wing takes place such that, when setting a predetermined aero balance (AB), the downforce at the front axle (FDF), the downforce at the rear axle (RDF) and/or the resultant downforce (DF) is continuously settable. It is thus achieved that the aero balance always lies within the preselected range, so that the handling of the vehicle is ensured and optionally the downforce does not achieve the required target values.

It is also advantageous if the setting of the front wing and/or of the rear wing takes place such that, when setting and/or maintaining a substantially neutral aero balance (AB), the downforce at the front axle (FDF), the downforce at the rear axle (RDF) and/or the resultant downforce (DF) is continuously settable. Thus, within the framework of the boundary conditions, the aero balance can be set or maintained substantially in a balanced manner while the downforce is set or adjusted.

The object relating to the method is achieved by the features of claim 6.

An exemplary embodiment of the invention relates to a method for controlling the aero balance (AB) and/or a resultant downforce (DF) of a motor vehicle with an automatically settable front wing and with an automatically settable rear wing, each of which is settable under the control of an actuator, wherein the motor vehicle has a front axle with front wheels and a rear axle with rear wheels, wherein, by means of the setting of the front wing and/or by means of the setting of the rear wing, owing to the incident flow of air at the front axle a downforce at the front axle (FDF) can be set and owing to the incident flow of air at the rear axle a downforce at the rear axle (RDF) can be set, wherein a resultant downforce DF=(FDF+RDF) acting through a point (CoP) can be generated and an aero balance (AB) as AB=FDF/DF*100% can be set, wherein the rear wing and/or the front wing are set automatically in dependence on an operating state of the motor vehicle such that a predetermined downforce at the front axle (FDF), a predetermined downforce at the rear axle (RDF), a predetermined resultant downforce (DF) and/or a predetermined aero balance (AB) is obtained. It is thus achieved that the aero balance can be set automatically together with the downforce in order not to adversely affect the handling of the motor vehicle even in different operating states.

It is particularly advantageous if the operating state is determined by an operating mode that is present, in particular a so-called aero mode, and/or by actuation by the driver of an actuating means for setting the downforce and/or the aero balance. In this case, the operating state can be specified by a controller, for example, and/or can be specified by the driver of the motor vehicle. In particular a so-called aero mode can thus also be selectable by the driver and/or by the controller, in which mode different styles of the downforce and/or of the aero balance can be selected. For example, it is possible to choose between an operating mode with the lowest possible downforce and an operating mode with a higher downforce.

It is further also advantageous in a further exemplary embodiment of the method if, when setting the front wing and/or the rear wing, the setting of the predetermined aero balance (AB) is prioritized before the setting of a predetermined downforce at the front axle (FDF), a predetermined downforce at the rear axle (RDF) and a predetermined resultant downforce (DF). It is thus achieved that the aero balance preferably lies within the preselected range, so that the handling of the motor vehicle is ensured and optionally the downforce does not achieve the required target values.

It is further also advantageous in a further exemplary embodiment of the method if the setting of the front wing and/or of the rear wing takes place such that, when setting a predetermined aero balance (AB), the downforce at the front axle (FDF), the downforce at the rear axle (RDF) and/or the resultant downforce (DF) is set or adjusted continuously. Thus, within the framework of the boundary conditions, the aero balance can be set or maintained substantially in a balanced manner while the downforce (DF) is set or adjusted.

It is further also advantageous in a further exemplary embodiment of the method if the setting of the front wing and/or of the rear wing takes place such that, when setting and/or maintaining a substantially neutral aero balance (AB), the downforce at the front axle (FDF), the downforce at the rear axle (RDF) and/or the resultant downforce (DF) is set or adjusted continuously. Thus, within the framework of the boundary conditions, the aero balance can be set or maintained substantially in a balanced manner while the downforce (DF) is set or adjusted.

BRIEF DESCRIPTION OF THE DRAWINGS

The invention will be explained in detail in the following text by means of an exemplary embodiment with reference to the drawings, in which.

DETAILED DESCRIPTION OF THE INVENTION

Figure 1:
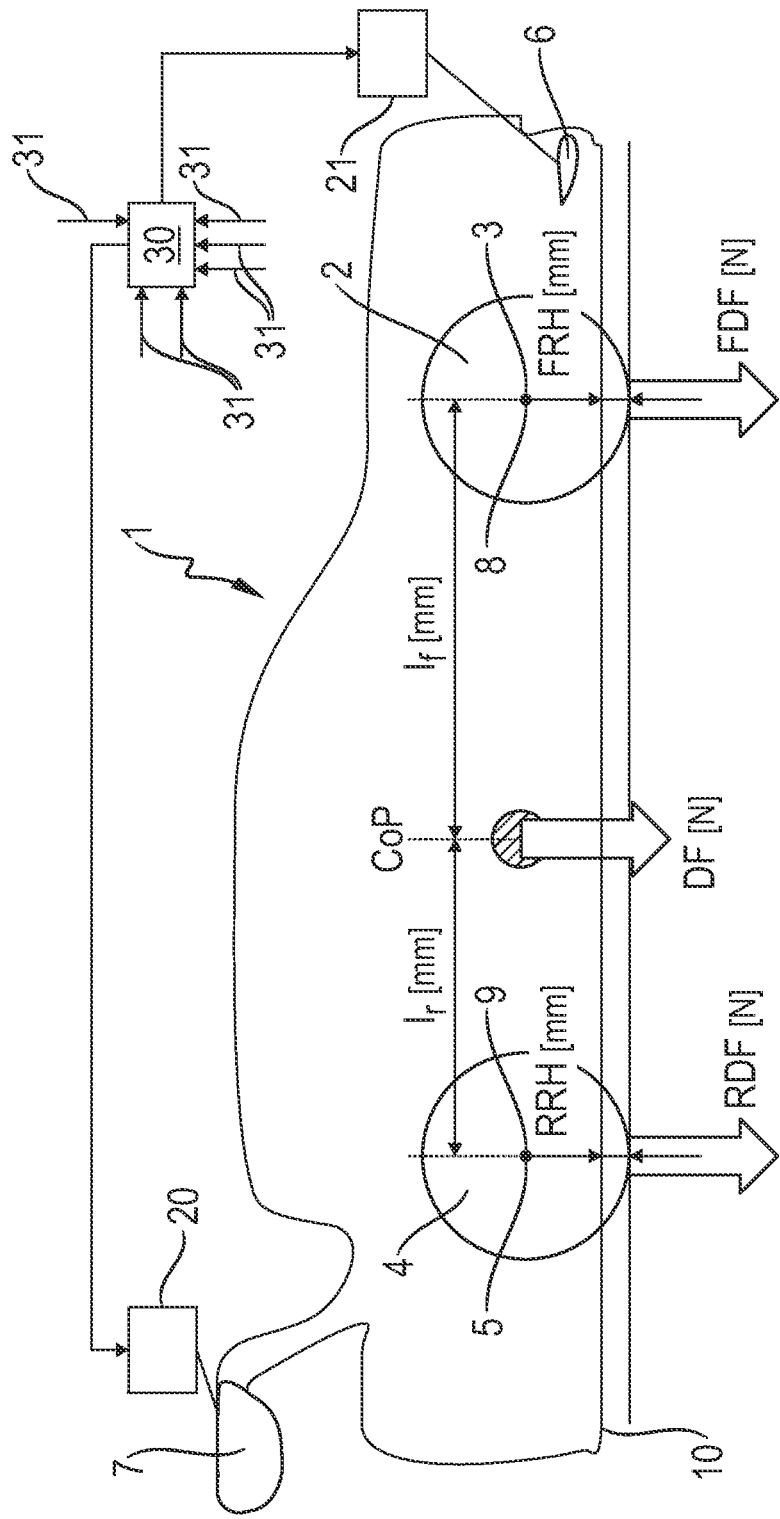
FIG. 1 shows a schematic representation of a motor vehicle for the purpose of explaining the motor vehicle according to aspects of the invention and the method according to aspects of the invention.

FIG. 1 shows a schematic representation of a motor vehicle 1 with front wheels 2 on the front axle 3 and with rear wheels 4 on the rear axle 5.

The motor vehicle 1 has at least one front wing 6 and at least one rear wing 7, each of which is individually adjustable. Actuators, in particular electromotive actuators, are provided for this purpose, so that the at least one front wing 6 is adjustable by at least a first actuator and the at least one rear wing 7 is adjustable by at least a second actuator.

Advantageously and optionally, two front wings 6 which are actuated by two first actuators are provided, wherein in particular one of the front wings 6 is actuated by one of the first actuators.

Advantageously and optionally, a rear wing 7 which is actuated by two second actuators is provided.

There are also provided optionally at least one means 8 for determining the downforce (FDF) at the front axle 3 and optionally a means 9 for determining the downforce (RDF) at the rear axle 5. These optional means 8, 9 are in the form of, for example, force sensors on the front axle 3 and on the rear axle 5.

A correlation between the downforce coefficient and the wing angle of the at least one rear wing 7 and the wing angle of the at least one front wing 6 is advantageously and optionally determined in a wind tunnel and then applied when the motor vehicle is driving.

The wing angle at the at least one front wing 6 and at the at least one rear wing 7 is measured via sensors. The downforces at the front axle 3 and at the rear axle 4 are determined from the values of the wing angles, the vehicle speed and the calculated ride heights stored in the control unit 30.

The downforce at the front axle 3 is denoted FDF, it is the driving force. The downforce at the rear axle 5 is denoted RDF, it is likewise a downward force. The downward force DF is also called the downforce.

This gives the total downforce DF as DF=FDF+RDF, which acts at the point CoP of the resultant total downforce DF. The CoP lies behind the front axle 3 by a dimension 'lf' and in front of the rear axle 5 by a dimension 'lr'. The height of the underbody 10 at the front axle 3 is FRH and the height of the underbody 10 at the rear axle is RRH. This gives the rake as rake=RRH−FRH. There can be determined therefrom, for example, a pitch angle relative to the horizontal. The pitch angle is the inclination of the motor vehicle 1 about a transverse axis of the motor vehicle 1.

The aero balance AB is given as AB=(FDF/DF)*100%, where FDF=the downforce at the front axle, DF is the sum of the downforce FDF at the front axle 3 plus the downforce RDF at the rear axle 5. The aero balance AB is dependent on the setting of the front wing 6 and of the rear wing 7. If the front wing 6 and/or the rear wing 7 is adjusted, this has an effect on the aero balance AB.

Figure 2:
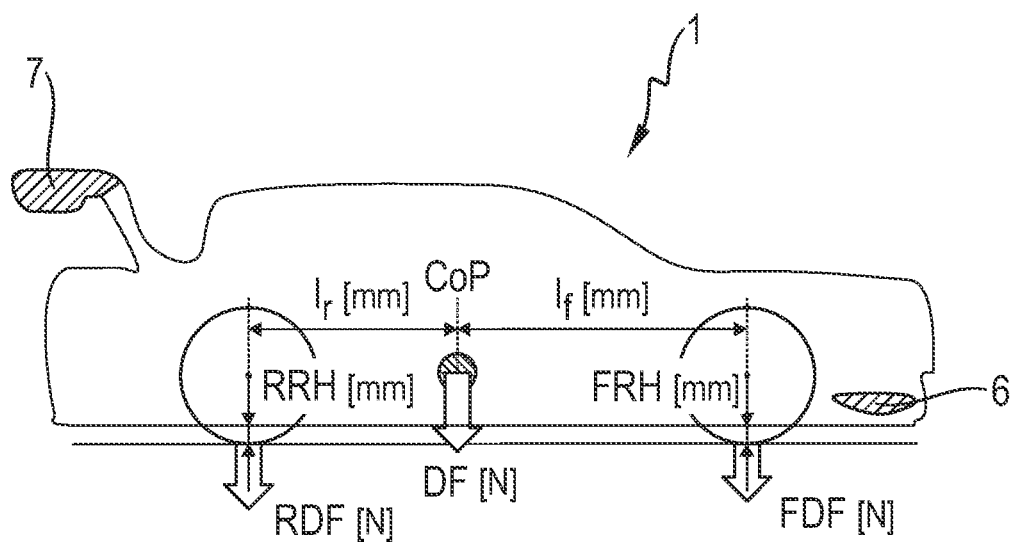
FIG. 2 shows a further schematic representation of a motor vehicle for the purpose of explaining the motor vehicle according to aspects of the invention and the method according to aspects of the invention.

FIG. 2 shows an example in which the front wing 6 and the rear wing 7 are set in a first operating position, in particular a first operating end position, with a low downforce, a so-called low downforce position (LDF), in which only a low downforce with little aerodynamic resistance is generated. A high final speed of the motor vehicle 1, for example, can thus be achieved.

Figure 3:
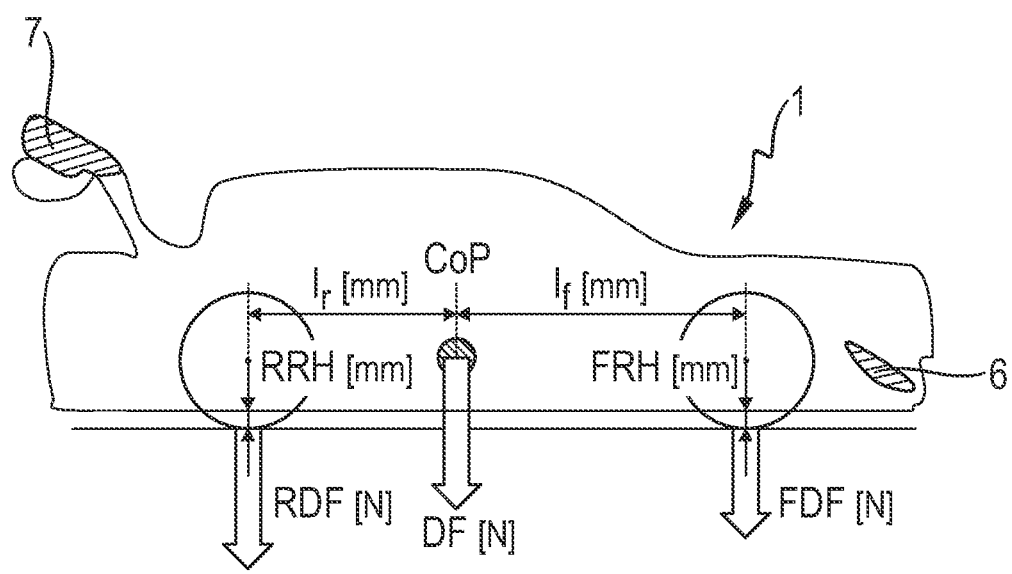
FIG. 3 shows a further schematic representation of a motor vehicle for the purpose of explaining the motor vehicle according to aspects of the invention and the method according to aspects of the invention.

FIG. 3 shows an example in which the front wing 6 and the rear wing 7 are set in a second operating position, in particular a second operating end position, with a high downforce, a so-called high downforce position (HDF), in which a high downforce is generated. A high cornering speed, for example, can thus be achieved.

A control unit 30 for activating the actuators 20, 21 for adjusting the front wing 6 and the rear wing 7 is provided. This control unit 30 receives a multitude of vehicle data and/or measured data from sensors and/or other control units, also referred to generally as data 31. The control unit 30 determines the target setting of the front wing 6 and of the rear wing 7 on the basis of the available data 31, or input parameters, and is able to compare this target setting with the actual setting in order to output a respective activation signal for the actuators 20, 21 in order to adjust the front wing 6 and/or the rear wing 7. Alternatively, the control unit 30 can provide the actuators 20, 21 with a signal representing the target setting independently of the actual setting, and the actuators 20, 21 then carry out the setting depending on whether the target setting differs from the actual setting. Reference is made in this connection to FIG. 1.

Figure 4:
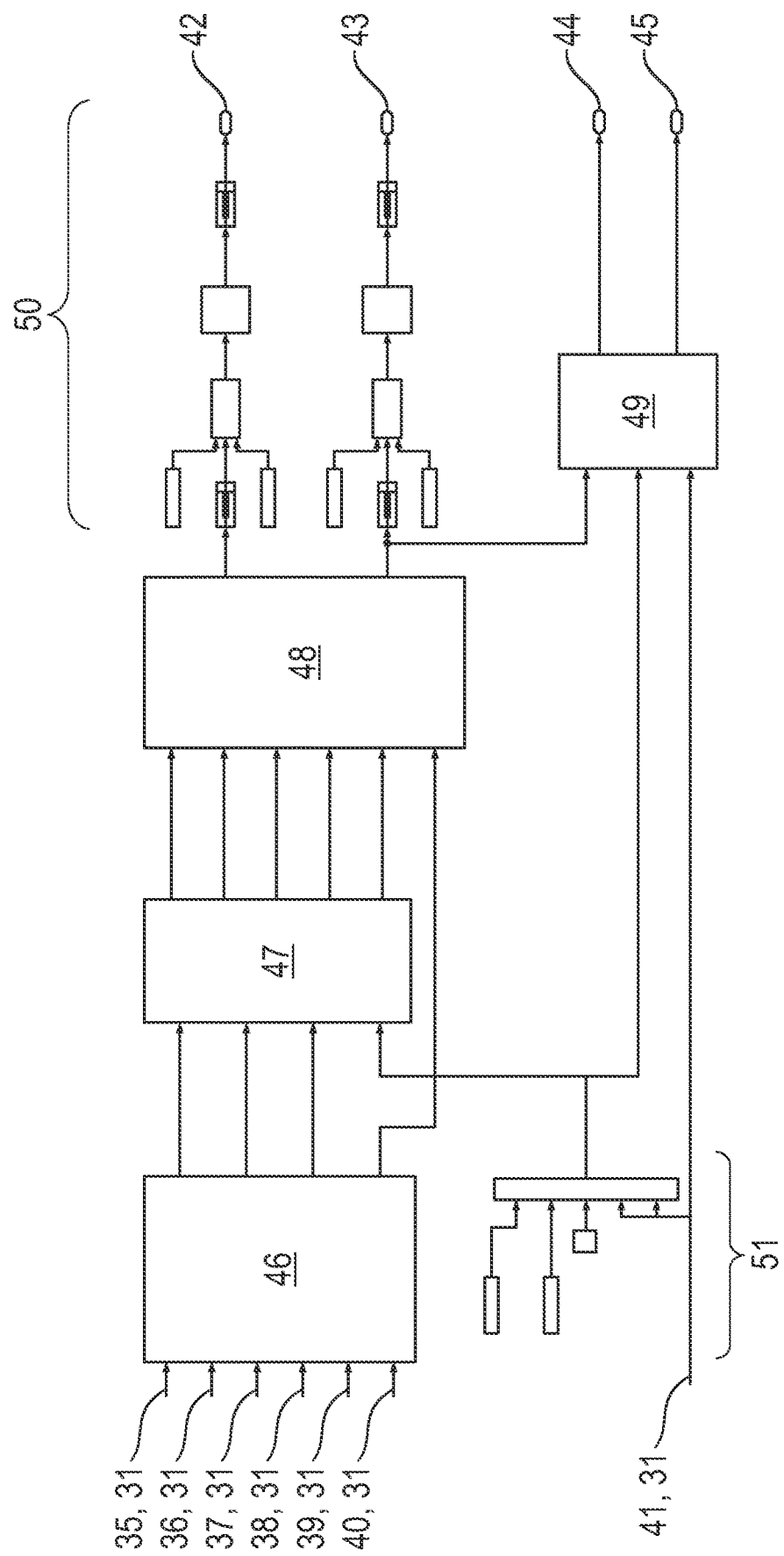
FIG. 4 is a block diagram for the purpose of explaining the motor vehicle according to aspects of the invention and the method according to aspects of the invention.

FIG. 4 is a block diagram for the purpose of explaining the method according to aspects of the invention.

The following data, for example, are used as input parameters 31:

Aero button 35=status information on whether the aero button has been pressed, that is to say the driver wishes for and has inputted a low downforce state (LDF).

Aero mode 36=status information which indicates whether the aero mode is currently switched on, or present, as the operating mode.

Enable bit 37=an enable bit of the controller from a vehicle dynamics control system, called PSM or ESC (electronic stability control), so that the downforce may or may not be changed.

Auto PSM 38=an information bit because of the automatic PSM functionality, according to which the aero balance and the downforce are set automatically.

Delta downforce 39=a value for a desired change in the downforce as a delta value relative to the current value of the downforce. The input value 39 represents a differential downforce value delta DF, that is to say a request to change the mean downforce value DF, for example by a value between 0 and 3000 N relative to a DF value of 0, that is to say, for example, an increase in DF by 500 N.

Delta aero balance 40=a value for a desired change in the aero balance as a delta value relative to the current value of the aero balance. The input value 40 represents the differential aero balance delta aero balance, from, for example, −26% to +15% about a standard value of 0. That is to say, an aero balance set by hardware, for example (balance HW)=AB=35% is changed by a delta value delta aero balance (delta AB) to give the total aero balance of the motor vehicle: balance HW+delta AB=total AB veh.

Vehicle reference speed 41=a value of a target vehicle speed.

From these data 31 as input values, the control unit 30 determines the following output values 42, 43, 44 and 45:

Output value 42 is a value for a target actuator position for the actuator for setting and adjusting the front wing 6.

Output value 43 is a value for a target actuator position for the actuator for setting and adjusting the rear wing 7.

Output value 44 is a bit for adjusting a defined vehicle speed, which is received by a unit which controls the vehicle speed.

Output value 45 is a bit for setting an information lamp for informing the driver that he has reached the maximum permissible loads on the tires and he should reduce either the vehicle speed or the downforce (DF).

According to FIG. 4, the input values 31, that is to say 35 to 41, are processed by blocks 46 to 49, so that the output values 42 to 45 are obtained. The diagram of FIG. 4 is only a rough representation for the purpose of providing understanding of the procedure according to aspects of the invention.

In block 46, the parameters delta downforce 39 and delta aero balance 40, which are provided by a driving dynamics control system (PSM), are processed.

In block 47, component protection is implemented, so that the downforces on the motor vehicle 1 are correspondingly limited. There is preferably a limit value for the downforces on the body and a limit value for the tires, wherein an upper limit value and a lower limit value are fixed in each case. The downforce values are preferably also split for the front axle 3 and for the rear axle 5, so that a corresponding number of upper and lower limit values result.

In block 48, target values for the downforce coefficient at the front axle 3 and at the rear axle 5 are calculated. The target values of the aero balance AB are thereby preferably prioritized over the downforce, so that in cases where the required adjustment travel of the actuators for the front wing 6 and for the rear wing 7 would no longer be sufficient to set the aero balance AB and the downforce DF because of mechanical limitations, the aero balance is set at the desired value and the downforce is then set as far as it can be without the downforce DF reaching a target value or its target values at the front axle 3 and the rear axle 5.

In block 49, the tire loading due to the downforce at the front axle 3 and at the rear axle 5 is considered, and a warning is issued to the driver if the tire loading reaches a limit value. The driver is then requested to reduce the downforce DF and switch to a low downforce mode (LDF). When considering the tire loading, the load of the tires is integrated in dependence on the load and the speed, and the above warning is given to the driver when a settable limit value of the tire loading is reached.

Block 50 takes account of the signal transit time and the inertia of the actuators 20, 21 and compensates accordingly.

In block 50, the characteristic lines which represent the relationship between the target downforce coefficient and the target angle of the front wing and rear wing are depicted.

Block 51 serves to calculate the vehicle-speed-dependent physically calculated intermediate parameter DF/Ca and make it available to the individual modules.

One option in the concept of the invention is that the at least one rear wing 7 and/or the at least one front wing 6 can be set automatically in dependence on an operating state of the motor vehicle 1 such that a predetermined downforce FDF at the front axle 3, a predetermined downforce RDF at the rear axle 5, a predetermined resultant downforce DF and/or a predetermined aero balance AB is obtained. The desired aero balance AB is thereby reliably reached even if the end stops of the adjustment are reached for the adjustment of the at least one front wing and/or the at least one rear wing. In this case, when an end stop of one of the front wing and the rear wing is reached, the respective other wing is so set that the desired aero balance AB is nevertheless achieved.

LIST OF REFERENCE NUMERALS 1 motor vehicle
2 front wheels 3 front axle
4 rear wheels
5 rear axle
6 front wing
7 rear wing
8 means
9 means
10 underbody
20 actuator
21 actuator
30 control unit
31 data/input parameter
35 aero button
36 aero mode
37 enable bit
38 auto PSM
39 delta downforce
40 delta aero balance
41 vehicle reference speed
42 output value
43 output value
44 output value
45 output value
46 block
47 block
48 block
49 block
50 block
51 block

What is claimed is:

1. A motor vehicle comprising:
an automatically settable front wing that is moveable under the control of an actuator;
an automatically settable rear wing that is moveable under the control of another actuator;
a front axle with front wheels, wherein, owing to the incident flow of air at the front axle, a downforce at the front axle (FDF) can be set by setting a position of the front wing;
a rear axle with rear wheels, wherein, owing to the incident flow of air at the rear axle, a downforce at the rear axle (RDF) can be set by setting a position of the rear wing; and
a control unit that is connected to the actuators for (i) generating a resultant downforce DF=(FDF+RDF) acting through a point CoP, and (ii) setting an aero balance (AB) as AB=FDF/DF*100%,
wherein the control unit is configured to automatically set positions for the front wing and/or the rear wing in dependence on an operating state of the motor vehicle to obtain one or more of the following effects: a predetermined downforce (FDF) at the front axle, a predetermined downforce (RDF) at the rear axle, a predetermined resultant downforce (DF) and a predetermined aero balance (AB),
wherein, when setting the front wing and/or the rear wing, the setting of the predetermined aero balance (AB) is prioritized before the setting of a predetermined downforce (FDF) at the front axle, a predetermined downforce (RDF) at the rear axle and a predetermined resultant downforce (DF).

2. The motor vehicle as claimed in claim 1, wherein the operating state is determined by an operating mode that is present and/or by actuation by the driver of an actuating means for setting the downforce (DF) and/or the aero balance (AB).

3. The motor vehicle as claimed in claim 1, wherein the setting of the front wing and/or of the rear wing is carried out such that, when setting a predetermined aero balance (AB), the downforce (FDF) at the front axle, the downforce (RDF) at the rear axle and/or the resultant downforce (DF) is continuously settable.

4. The motor vehicle as claimed in claim 3, wherein the setting of the front wing and/or of the rear wing is carried out such that, when setting and/or maintaining a neutral aero balance (AB), the downforce (FDF) at the front axle, the downforce (RDF) at the rear axle and/or the resultant downforce (DF) is continuously settable.

5. The motor vehicle as claimed in claim 1, wherein the control unit is configured to automatically set positions for the front wing and the rear wing in dependence on the operating state of the motor vehicle to obtain one or more of said effects.

6. The motor vehicle as claimed in claim 1, wherein the control unit is configured to automatically set positions for the front wing and/or the rear wing in dependence on the operating state of the motor vehicle to obtain all of said effects.

7. The motor vehicle as claimed in claim 1, wherein the control unit is configured to automatically set positions for the front wing and the rear wing in dependence on the operating state of the motor vehicle to obtain all of said effects.

8. A method for controlling the aero balance (AB) and/or a resultant downforce (DF) of a motor vehicle having (i) an automatically settable front wing that is moveable under the control of an actuator; (ii) an automatically settable rear wing that is moveable under the control of another actuator; (iii) a front axle with front wheels, wherein, owing to the incident flow of air at the front axle, a downforce at the front axle (FDF) can be set by setting a position of the front wing; (iv) a rear axle with rear wheels, wherein, owing to the incident flow of air at the rear axle, a downforce at the rear axle (RDF) can be set by setting a position of the rear wing; and (v) a control unit that is connected to the actuators for (i) generating a resultant downforce DF=(FDF+RDF) acting through a point CoP, and (ii) setting an aero balance (AB) as AB=FDF/DF*100%, said method comprising:
automatically setting positions for the rear wing and/or the front wing in dependence on an operating state of the motor vehicle to obtain one or more of the following effects: a predetermined downforce (FDF) at the front axle, a predetermined downforce (RDF) at the rear axle, a predetermined resultant downforce (DF) and/or a predetermined aero balance (AB),
wherein, when setting the front wing and/or the rear wing, the setting of the predetermined aero balance (AB) is prioritized before the setting of a predetermined downforce (FDF) at the front axle, a predetermined downforce (RDF) at the rear axle and a predetermined resultant downforce (DF).

9. The method as claimed in claim 8, further comprising determining the operating state by an operating mode that is present and/or by actuation by the driver of an actuating means for setting the downforce (DF) and/or the aero balance (AB).

10. The method as claimed in claim 8, wherein the setting of the front wing and/or of the rear wing is carried out such that, when setting a predetermined aero balance (AB), the downforce (FDF) at the front axle, the downforce (RDF) at the rear axle and/or the resultant downforce (DF) is set or adjusted continuously.

11. The method as claimed in claim 10, wherein the setting of the front wing and/or of the rear wing is carried out such that, when setting and/or maintaining a neutral aero balance (AB), the downforce (FDF) at the front axle, the downforce (RDF) at the rear axle and/or the resultant downforce (DF) is set or adjusted continuously.

12. The method as claimed in claim 8, wherein the control unit is configured to automatically set positions for the front wing and the rear wing in dependence on the operating state of the motor vehicle to obtain one or more of said effects.

13. The method as claimed in claim 8, wherein the control unit is configured to automatically set positions for the front wing and/or the rear wing in dependence on the operating state of the motor vehicle to obtain all of said effects.

14. The method as claimed in claim 8, wherein the control unit is configured to automatically set positions for the front wing and the rear wing in dependence on the operating state of the motor vehicle to obtain all of said effects.

* * * * *